US011299193B2

(12) United States Patent
Fujimoto et al.

(10) Patent No.: US 11,299,193 B2
(45) Date of Patent: Apr. 12, 2022

(54) ELECTRIC VEHICLE

(71) Applicant: TOYOTA JIDOSHA KABUSHIKI KAISHA, Toyota (JP)

(72) Inventors: Tetsuya Fujimoto, Toyota (JP); Ikuru Konno, Toyoake (JP); Takenori Kubo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 16/834,580

(22) Filed: Mar. 30, 2020

(65) Prior Publication Data
US 2020/0317255 A1  Oct. 8, 2020

(30) Foreign Application Priority Data

Apr. 3, 2019 (JP) .............................. JP2019-071278

(51) Int. Cl.
*B60K 1/00* (2006.01)
*B62D 1/26* (2006.01)
(Continued)

(52) U.S. Cl.
CPC .............. *B62D 1/265* (2013.01); *B60L 50/60* (2019.02); *B62D 31/02* (2013.01); *B62D 47/00* (2013.01); *B60L 2200/18* (2013.01)

(58) Field of Classification Search
CPC ........ B62D 1/265; B62D 31/02; B62D 47/00; B60L 50/60; B60L 2200/18; B60K 1/00
See application file for complete search history.

(56) References Cited

U.S. PATENT DOCUMENTS 5,734,238 A * 3/1998 Yanagisawa .......... B60T 13/586
                                                                318/139
10,657,855 B2 * 5/2020 Matsuoka ............. G09F 21/048
(Continued)

FOREIGN PATENT DOCUMENTS

CN         112140855 A  * 12/2020  ................ B60K 1/00
CN         112141061 A  * 12/2020  ................ B60T 7/12
(Continued)

OTHER PUBLICATIONS

"Comfortable Self-driving Shuttle without a Steering Wheel, Unmanned Solution WITH:US", 2019 Seoul Motor Show [online], https://www.youtube.com/watch?v=ulpgCD7cPiw (published on Mar. 28, 2019), [searched on Mar. 4, 2021] (1 pages total).
(Continued)

*Primary Examiner* — Jacob B Meyer
(74) *Attorney, Agent, or Firm* — Sughrue Mion, PLLC

(57) ABSTRACT

An electric vehicle includes: a motor; a braking device for wheel braking, the braking device including a brake fluid pressure generation device; an air-conditioning device; and a battery as a power source for the motor. The vehicle is not provided with a driver seat that allows a user to operate a steering wheel, an accelerator pedal, and a brake pedal in a state where the user sits on the driver seat, and the vehicle is configured to perform automated driving. A first storage chamber and a second storage chamber are provided in a first end portion and a second end portion of the vehicle in the vehicle front-rear direction, respectively, such that the first storage chamber and the second storage chamber partially overlap a vehicle cabin in the vehicle front-rear direction. A third storage chamber is provided under a floor of the vehicle cabin.

6 Claims, 7 Drawing Sheets

(51) Int. Cl.
   *B60L 50/60*   (2019.01)
   *B62D 31/02*   (2006.01)
   *B62D 47/00*   (2006.01)

(56) References Cited

U.S. PATENT DOCUMENTS

| | | | | |
|---|---|---|---|---|
| 10,668,926 | B2 * | 6/2020 | Birnschein | B60K 1/00 |
| 11,167,798 | B1 * | 11/2021 | Butukuri | B62D 21/15 |
| 2004/0262940 | A1 * | 12/2004 | Johnson | B60N 2/3043 296/64 |
| 2008/0258682 | A1 * | 10/2008 | Li | B60L 50/66 320/109 |
| 2017/0124781 | A1 * | 5/2017 | Douillard | G01S 17/931 |
| 2018/0157265 | A1 * | 6/2018 | Kentley-Klay | B60L 50/66 |
| 2018/0265136 | A1 * | 9/2018 | Baccouche | B60N 2/06 |
| 2018/0345777 | A1 * | 12/2018 | Birnschein | B60L 50/50 |
| 2018/0345971 | A1 * | 12/2018 | Birnschein | B60K 7/0007 |
| 2019/0236534 | A1 * | 8/2019 | Kaneko | G05D 1/0274 |
| 2020/0317176 | A1 * | 10/2020 | Fujimoto | B60T 7/04 |
| 2020/0317180 | A1 * | 10/2020 | Fujimoto | B60T 13/686 |
| 2020/0317255 | A1 * | 10/2020 | Fujimoto | B62D 1/265 |
| 2020/0346574 | A1 * | 11/2020 | Cha | B60J 3/002 |
| 2020/0385074 | A1 * | 12/2020 | Birnschein | B60W 50/023 |
| 2020/0398915 | A1 * | 12/2020 | Birnschein | B60L 50/50 |
| 2020/0406877 | A1 * | 12/2020 | Konno | B60T 7/12 |

FOREIGN PATENT DOCUMENTS

| | | | | |
|---|---|---|---|---|
| EP | 3718803 | A1 * | 10/2020 | B60L 50/60 |
| EP | 3718842 | A2 * | 10/2020 | B60T 8/4018 |
| EP | 3718843 | A1 * | 10/2020 | B62D 33/06 |
| FR | 3046395 | A1 * | 7/2017 | B62D 31/02 |
| JP | 07-245811 | A | 9/1995 | |
| JP | 2002-355143 | A | 12/2002 | |
| JP | 4620125 | B2 | 1/2011 | |
| JP | 2020168933 | A * | 10/2020 | |
| KR | 10-2012-0075227 | A | 7/2012 | |
| WO | 2012/091404 | A2 | 7/2012 | |

OTHER PUBLICATIONS

Partial English translation of the Office Action dated Mar. 4, 2021 from the Korean Intellectual Property Office in KR Application No. 10-2020-0035773.

* cited by examiner

ELECTRIC VEHICLE

INCORPORATION BY REFERENCE

The disclosure of Japanese Patent Application No. 2019-071278 filed on Apr. 3, 2019 including the specification, drawings and abstract is incorporated herein by reference in its entirety.

BACKGROUND

1. Technical Field

The present disclosure relates to an electric vehicle that can transport a passenger by automated driving.

2. Description of Related Art

FIGS. 12 and 13 in Japanese Unexamined Patent Application Publication No. 2002-355143 (JP 2002-355143 A), for example, describe a traffic system in which automated driving is performed. In the traffic system, an in-vehicle component (electrical component) is stored in an inner space of a trestle frame constituting a seat for a plurality of people.

SUMMARY

In JP 2002-355143 A, in terms of the layout of a vehicle in which automated driving is enabled, it can be said that the layout of a manual driving vehicle provided with a conventional driver seat is employed. Note that the manual driving vehicle indicates a vehicle including a driver seat that allows a user to operate a steering wheel, an accelerator pedal, and a brake pedal in a state where the user sits on the driver seat. From this point, it is considered that, in terms of a vehicle in which automated driving is enabled, a point that a space for a vehicle cabin is increased as large as possible and load distribution to the front side and the rear side in the vehicle is set appropriately has not been examined sufficiently.

In consideration of the above circumstance, the present disclosure is to provide an electric vehicle that can transport a passenger by automated driving, the electric vehicle being configured such that a vehicle cabin space is increased as large as possible and a load distribution to the front side and the rear side in the vehicle can be set appropriately.

An electric vehicle according to one aspect of the present disclosure includes a motor, a braking device for wheel braking, an air-conditioning device, and a battery. The motor is configured to generate driving force for traveling. The braking device includes a brake fluid pressure generation device. The battery is provided as a power source for the motor. The vehicle is not provided with a driver seat that allows a user to operate a steering wheel, an accelerator pedal, and a brake pedal in a state where the user sits on the driver seat. The vehicle is configured to perform automated driving. A first storage chamber and a second storage chamber are provided in a first end portion and a second end portion of the vehicle in the vehicle front-rear direction, respectively, such that the first storage chamber and the second storage chamber partially overlap a vehicle cabin in the vehicle front-rear direction. A third storage chamber is provided under a floor of the vehicle cabin. An occupant seat is provided in either one of first and second end portions inside the vehicle cabin in the vehicle front-rear direction such that the occupant seat faces the other one of the first and second end portions. The motor is stored in either one of the first storage chamber and the second storage chamber. The brake fluid pressure generation device and the air-conditioning device are stored in the other one of the first storage chamber and the second storage chamber. The battery is stored in the third storage chamber.

Note that, in the above aspect, the end portion does not indicate an edge in the vehicle front-rear direction. The end portion indicates a part having a predetermined width in the vehicle front-rear direction.

In the above aspect, the first storage chamber and the second storage chamber are arranged to partially overlap the vehicle cabin in the vehicle front-rear direction, and then, the motor, the brake fluid pressure generation device, and the air-conditioning device are stored in the first storage chamber and the second storage chamber in a divided manner. Accordingly, while respective spaces of the first storage chamber and the second storage chamber are used effectively, load distribution to the front side and the rear side of the vehicle can be set appropriately.

Note that, in the above aspect, it should be understood that the electric vehicle in which automated driving is enabled includes an electric vehicle configured to perform fully-automated driving that does not need any operation by an occupant at all and also includes an electric vehicle configured to perform semi-automated driving in which the occupant performs auxiliary operations. That is, the configuration of the electric vehicle according to the present disclosure is clearly different from a configuration of a manual driving vehicle including a conventional and general driver seat, for example.

In the above aspect, either one of the first and second end portions inside the vehicle cabin in the vehicle front-rear direction may not be provided with a steering wheel and a foot brake mechanically connected to wheels. With the above configuration, the electric vehicle according to the present disclosure is more clearly different from the manual driving vehicle including a conventional and general driver seat.

Further, in the above aspect, the occupant seat may be a first occupant seat, and a second occupant seat may be provided in the other one of the first and second end portions inside the vehicle cabin in the vehicle front-rear direction such that the second occupant seat faces the one of the first and second end portions. With the configuration, a plurality of passengers can be seated inside the vehicle cabin so as to face each other in the vehicle front-rear direction.

Further, in the above aspect, the first storage chamber and the second storage chamber may extend upward from the third storage chamber.

Further, in the above aspect, the brake fluid pressure generation device and the air-conditioning device may be arranged so as to overlap each other in the vehicle front-rear direction.

With the above configuration, in comparison with a case where the brake fluid pressure generation device and the air-conditioning device are arranged so as not to overlap each other in the vehicle front-rear direction, the storage chamber in which the brake fluid pressure generation device and the air-conditioning device are stored can be reduced in size in the vehicle front-rear direction. This is advantageous to increase a space for the vehicle cabin as large as possible.

Further, in the above aspect, the brake fluid pressure generation device may include a reservoir tank in which hydraulic fluid is stored, an actuator body portion configured to supply brake fluid pressure to a wheel brake unit, and an electric motor configured to pressurize the hydraulic fluid in the reservoir tank and supply the hydraulic fluid to the actuator body portion as the brake fluid pressure. Elements constituting the brake fluid pressure generation device may be arrayed in the vehicle width direction. The brake fluid pressure generation device may be arranged above the air-conditioning device.

In the above configuration, in comparison with a case where, for example, a brake master cylinder is arranged such that a longitudinal direction of the master cylinder is along the vehicle front-rear direction like a manual driving vehicle including a conventional and general driver seat, it is possible to reduce the size, in the vehicle front-rear direction, of the storage chamber in which the brake fluid pressure generation device and the air-conditioning device are stored. This is advantageous to increase the space for the vehicle cabin as large as possible.

With the present disclosure, in an electric vehicle that can transport a passenger by automated driving, a space for a vehicle cabin can be increased as large as possible, and load distribution to the front side and the rear side of the vehicle can be set appropriately.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes the best mode for carrying out the disclosure in detail with reference to the attached drawings.

Figure 1:
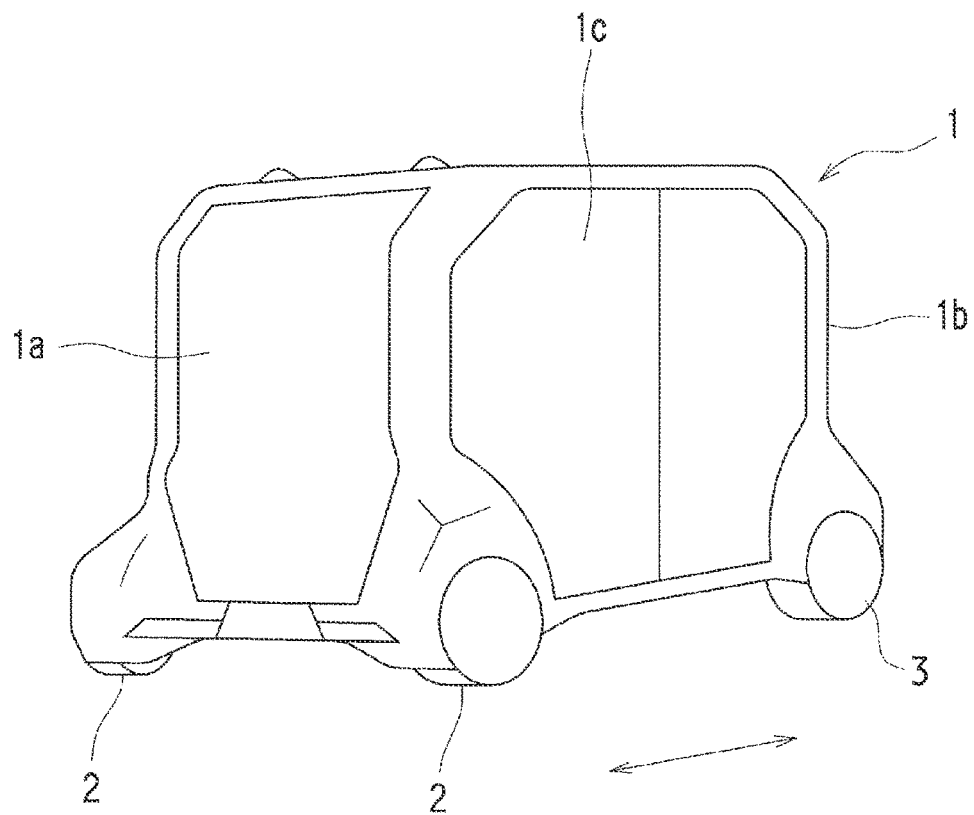
FIG. 1 is a perspective view schematically illustrating an external appearance of an electric vehicle according to an embodiment of the present disclosure.

One embodiment of the present disclosure is illustrated in FIGS. 1 to 8. As illustrated in FIG. 1, an electric vehicle 1 described in the present embodiment has an external appearance that is greatly different from a manual driving vehicle including a conventional and general driver seat in that the electric vehicle 1 has a vehicle body that is almost symmetrical in an advancing direction (see an arrow in FIG. 1), wheels 2, 3 are arranged extremely close to both ends of the electric vehicle 1, respectively, there is no hood or the like covering an engine compartment (a motor room), and an almost entire surface of a vehicle side face 1c is configured as a doorway.

Note that, since the electric vehicle 1 can advance to both sides in the advancing direction in generally the same mode, there is no concept of a front side and a rear side in the electric vehicle 1. However, for convenience, the left side in FIG. 1 is described as a front end portion 1a in the vehicle front-rear direction, and the right side in FIG. 1 is described as a rear end portion 1b in the vehicle front-rear direction. Further, in each of the drawings, an arrow Fr indicates the front side in the vehicle front-rear direction, an arrow Rh indicates the right side in the vehicle width direction, and an arrow Up indicates the upper side. Further, the manual driving vehicle indicates a vehicle including a driver seat that allows a user to operate a steering wheel, an accelerator pedal, and a brake pedal in a state where the user sits on the driver seat.

Figure 2:
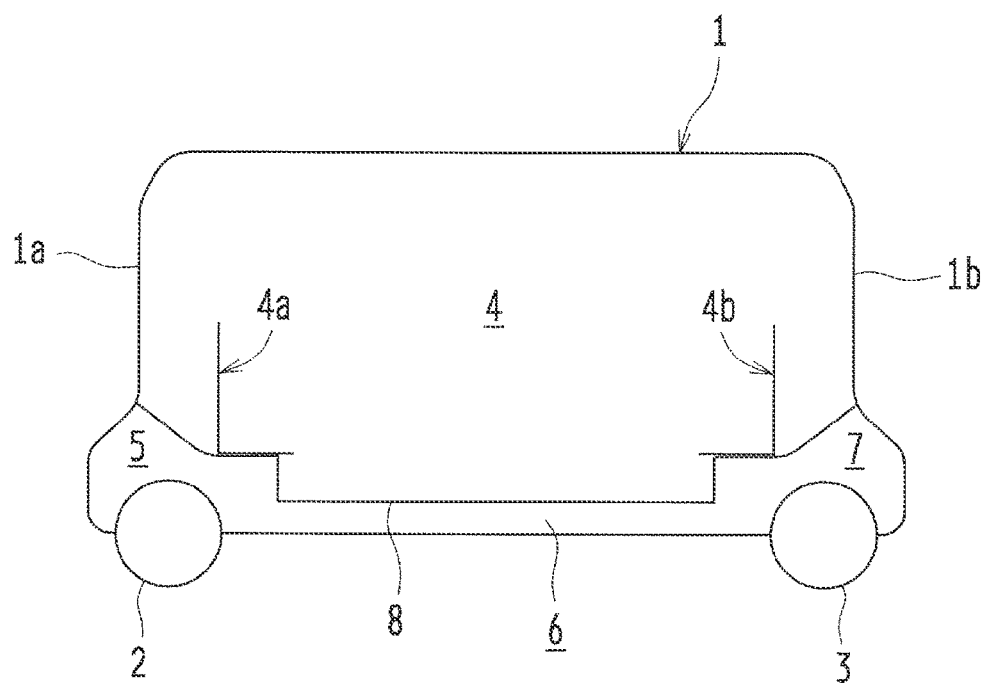
FIG. 2 is a vertical sectional view schematically illustrating the inside of the electric vehicle of FIG. 1.

Note that the electric vehicle 1 is a vehicle in which so-called "automated driving" is enabled, and because of this, not only the external appearance but also the inside of the electric vehicle 1 is greatly different from that of the manual driving vehicle including a conventional and general driver seat, as illustrated in FIG. 2. Note that the "automated driving" is a concept that includes not only fully-automated driving that does not need any operation by an occupant at all, but also semi-automated driving in which the occupant performs auxiliary operations.

For example, the electric vehicle 1 performs automated driving such that an ECU 50 (see FIG. 4) as a control device actuates an electric drive motor 51 (see FIG. 3), a steering actuator (not shown), a brake actuator 20 (see FIG. 3), and so on based on information from a camera, a sensor, a radar, a GPS antenna, and so on (not shown), commands transmitted from an external server through a network, and so on.

Therefore, in the electric vehicle 1, the presence of a so-called "driver" is not essential. As illustrated in FIG. 2, a driver seat configured such that a user operates a steering wheel, an accelerator pedal, and a brake pedal in a state where the user sits on the driver seat is not provided in a vehicle cabin 4. For example, in the vehicle cabin 4, occupant seats 4a, 4b are provided in a front end portion and a rear end portion of the vehicle cabin 4 in the vehicle front-rear direction such that the occupant seats 4a, 4b face each other in the vehicle front-rear direction. The occupant seats 4a, 4b are each configured such that a plurality of occupants can be seated side by side. Further, operation parts to be operated by a driver, e.g., a steering wheel and a brake pedal mechanically connected to the wheels 2 or the wheels 3, are not permanently provided in the vehicle cabin 4. Because of this, a proportion of the vehicle cabin 4 in the entire electric vehicle 1 is very large. Note that the state where "the operation part is not permanently provided in the vehicle cabin 4" includes not only a case where the operation part is not provided at all in the electric vehicle 1 itself, but also a case where the operation part that is normally hidden in a first storage chamber 5, a second storage chamber 7, or a third storage chamber 6 appears in the vehicle cabin 4 as a result of a button operation and so on, for example, when an unexpected situation occurs.

As a matter of course, the electric vehicle 1 is configured to perform the fully-automated driving by the ECU 50 and so on and also perform the semi-automated driving in which an auxiliary operation is performed by an operator as a monitoring person who is in the vehicle cabin 4.

For example, a system of the electric vehicle 1 is configured such that the operator monitors situations around the electric vehicle 1 when a surrounding image captured by a camera is projected on a tablet PC (not shown) owned by the operator, and the operator actuates an emergency stop brake or the like by pressing a button icon on an image on the tablet PC.

Note that the presence of the operator in the vehicle cabin 4 is also not essential, and for example, an operator and so on in an external management center may play a role of the operator inside the vehicle cabin 4, or an external server may play a similar role.

Further, in the electric vehicle 1, the first storage chamber 5 and the second storage chamber 7 are provided in the front end portion 1a and the rear end portion 1b of the electric vehicle 1, respectively, such that the first storage chamber 5 and the second storage chamber 7 partially overlap the vehicle cabin 4 in the vehicle front-rear direction, as illustrated in FIG. 2. In the first storage chamber 5 and the second storage chamber 7, driving system apparatuses and electric system apparatuses such as the ECU 50, the electric drive motor 51, the steering actuator, and the brake actuator 20 are stored.

More specifically, the first storage chamber 5 placed on the front side in the vehicle front-rear direction and the second storage chamber 7 placed on the rear side in the vehicle front-rear direction are separated from the vehicle cabin 4 by frame members such as front side members 65 (see FIG. 6) and a crossmember 63 (see FIG. 6) to be described later, and panel members of a cabin constituting the vehicle cabin 4 (hereinafter also referred to as a frame member 8 or the like). Thus, in the electric vehicle 1, spaces above the first storage chamber 5 and the second storage chamber 7 can be used as the vehicle cabin 4.

Note that the electric vehicle 1 in the present embodiment employs a drive system in which the electric drive motor 51 inputs driving force into the rear wheels 3.

The electric drive motor 51 uses a battery 52 as a power source. The battery 52 is arranged in the third storage chamber 6 provided under a floor of the vehicle cabin 4 of the electric vehicle 1.

As such, by elaborating configurations, structures, and arrangement of various pieces of onboard equipment, the electric vehicle 1 of the present embodiment that is greatly different from a manual driving vehicle including a conventional and general driver seat is achieved as a vehicle in which the proportion of the vehicle cabin 4 in the entire electric vehicle 1 is very large (proportions of the first storage chamber 5, the second storage chamber 7, and so on where the onboard equipment is stored are very low), as described above.

The following describes details of a functional configuration, a structure, arrangement, and so on of a braking device 10 as a part of factors that achieve such a relatively wide vehicle cabin 4.

Schematic Configuration of Braking Device 10

Figure 3:
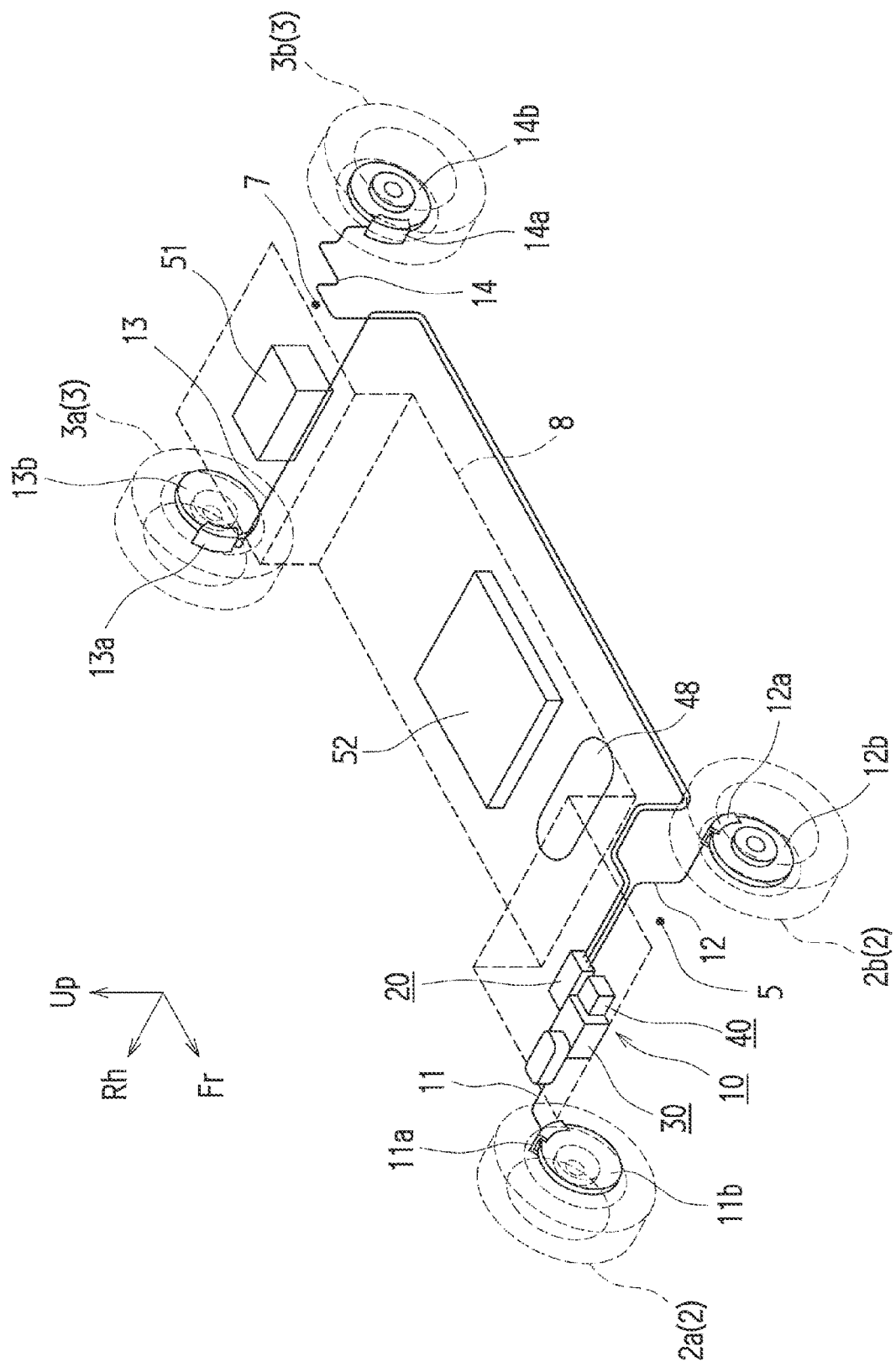
FIG. 3 is a perspective view schematically illustrating a braking device.

The braking device 10 is used to brake the wheels 2, 3. As illustrated in FIG. 3, the braking device 10 includes the brake actuator 20 as a primary brake fluid pressure generation device, the brake unit 30 as a secondary brake fluid pressure generation device, the brake pedal unit 40 as an emergency brake fluid pressure generation device, a wheel brake unit (its reference numeral is omitted) to be described below, and so on.

Details of configurations of the brake actuator 20, the brake unit 30, and the brake pedal unit 40 will be described later, but the brake actuator 20 and the brake unit 30 are electrically actuated devices configured to generate brake fluid pressure in electric motors 26, 36 (see FIG. 5), respectively. The brake pedal unit 40 is a pneumatically actuated device configured to operate by compressed air filled in an air tank 48 arranged in the third storage chamber 6. The electric motors 26, 36 employ the battery 52 as a power source, the battery 52 being arranged in the third storage chamber 6.

Further, the wheel brake unit is configured to brake (decelerate or stop) the wheels 2, 3 by the brake fluid pressure generated by the brake actuator 20, the brake unit 30, and the brake pedal unit 40. The wheel brake unit includes first to fourth brake pipes 11, 12, 13, 14, first to fourth brake calipers 11a, 12a, 13a, 14a, first to fourth brake discs 11b, 12b, 13b, 14b, and so on.

Figure 4:
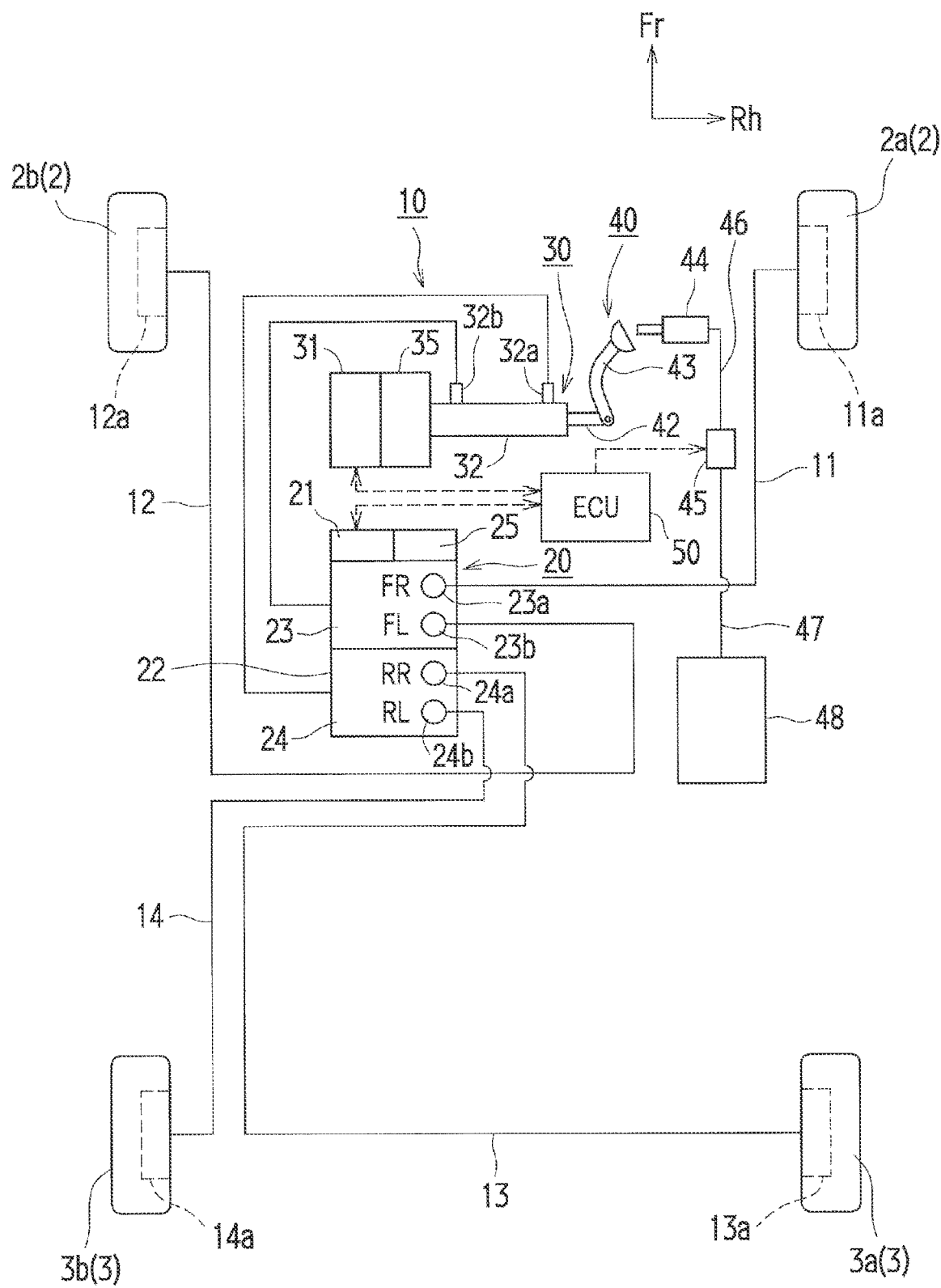
FIG. 4 is a view illustrating a schematic configuration of the braking device.

The first brake caliper 11a and the first brake disc 11b are provided in a part supporting a right front wheel (indicated by a reference numeral 2a in FIGS. 3 and 4). The first brake caliper 11a is connected to a first port 23a (see FIG. 4) of the brake actuator 20 via the first brake pipe 11 extending to the right side in the vehicle width direction inside the first storage chamber 5.

The second brake caliper 12a and the second brake disc 12b are provided in a part supporting a left front wheel (indicated by a reference numeral 2b in FIGS. 3 and 4). The second brake caliper 12a is connected to a second port 23b (see FIG. 4) of the brake actuator 20 via the second brake pipe 12 extending to the left side in the vehicle width direction inside the first storage chamber 5.

The third brake caliper 13a and the third brake disc 13b are provided in a part supporting a right rear wheel (indicated by a reference numeral 3a in FIGS. 3 and 4). The third brake caliper 13a is connected to a third port 24a (see FIG. 4) of the brake actuator 20 via the third brake pipe 13. The third brake pipe 13 first extends to the left side in the vehicle width direction inside the first storage chamber 5 and then extends rearward in the vehicle front-rear direction inside the third storage chamber 6 so as to reach the second storage chamber 7. Then, the third brake pipe 13 extends to the right side in the vehicle width direction inside the second storage chamber 7.

The fourth brake caliper 14a and the fourth brake disc 14b are provided in a part supporting a left rear wheel (indicated by a reference numeral 3b in FIGS. 3 and 4). The fourth brake caliper 14a is connected to a fourth port 24b (see FIG. 4) of the brake actuator 20 via the fourth brake pipe 14. The fourth brake pipe 14 is configured such that, after the fourth brake pipe 14 reaches the second storage chamber 7 similarly to the third brake pipe 13, the fourth brake pipe 14 extends to the left side in the vehicle width direction inside the second storage chamber 7.

Detailed Configuration of Each Constituent of Braking Device 10

As illustrated in FIG. 4, as a brake fluid pressure transmission route in the braking device 10, the brake unit 30 and the brake pedal unit 40 are placed on the most upstream side, and the brake actuator 20 is placed on the downstream side from the brake unit 30 and the brake pedal unit 40, so that brake fluid pressure is supplied from the brake actuator 20 to the first to fourth brake calipers 11a, 12a, 13a, 14a.

The brake actuator 20 includes a brake ECU 21, an actuator body portion 22, a reservoir tank 25, the electric motor 26, and so on.

The brake ECU 21 is connected to the ECU 50 via a communication line and is configured to actuate the electric motor 26 based on a braking force request calculated by the ECU 50 based on information (a vehicle speed, a distance to a stop line and an obstacle, and so on) from the sensor, the camera, and so on so that the electric motor 26 pumps up hydraulic fluid from the reservoir tank 25 and pressurizes the hydraulic fluid.

That is, the brake actuator 20 is configured to generate brake fluid pressure as much as necessary (to an extent requested by the ECU 50) when necessary (when the ECU 50 makes a request).

The actuator body portion 22 is divided into a first fluid chamber 23 and a second fluid chamber 24, as illustrated in FIG. 4.

The first and second ports 23a, 23b are provided in the first fluid chamber 23, and the hydraulic fluid pressurized by the electric motor 26 based on a command from the brake ECU 21 is supplied from the first and second ports 23a, 23b to the first and second brake calipers 11a, 12a, respectively.

The third and fourth ports 24a, 24b are provided in the second fluid chamber 24, and the hydraulic fluid pressurized by the electric motor 26 based on the command from the brake ECU 21 is supplied from the third and fourth ports 24a, 24b to the third and fourth brake calipers 13a, 14a, respectively.

Since the actuator body portion 22 is divided into two fluid chambers, i.e., the first fluid chamber 23 and the second fluid chamber 24, as such, even if one of the fluid chambers is broken or the like, it is possible to supply the brake fluid pressure to the wheels 2, 3 from the other one of the fluid chambers without losing the brake fluid pressure.

Further, since the brake actuator 20 is placed on the downstream side from the brake unit 30, even when the brake unit 30 has a malfunction, the brake actuator 20 can independently supply the brake fluid pressure to the first to fourth brake calipers 11a, 12a, 13a, 14a.

The brake unit 30 is configured such that, even in a case where the brake actuator 20 operates normally, when relatively large braking force is required, the brake unit 30 generates brake fluid pressure so as to assist the brake actuator 20. In the meantime, the brake unit 30 is configured to generate brake fluid pressure instead of the brake actuator 20 when the brake actuator 20 has a malfunction.

The brake unit 30 includes a brake ECU 31, a master cylinder 32, a reservoir tank 35, the electric motor 36, an accumulator 37, a first electromagnetic valve 38, a second electromagnetic valve 39, and so on.

Figure 5:
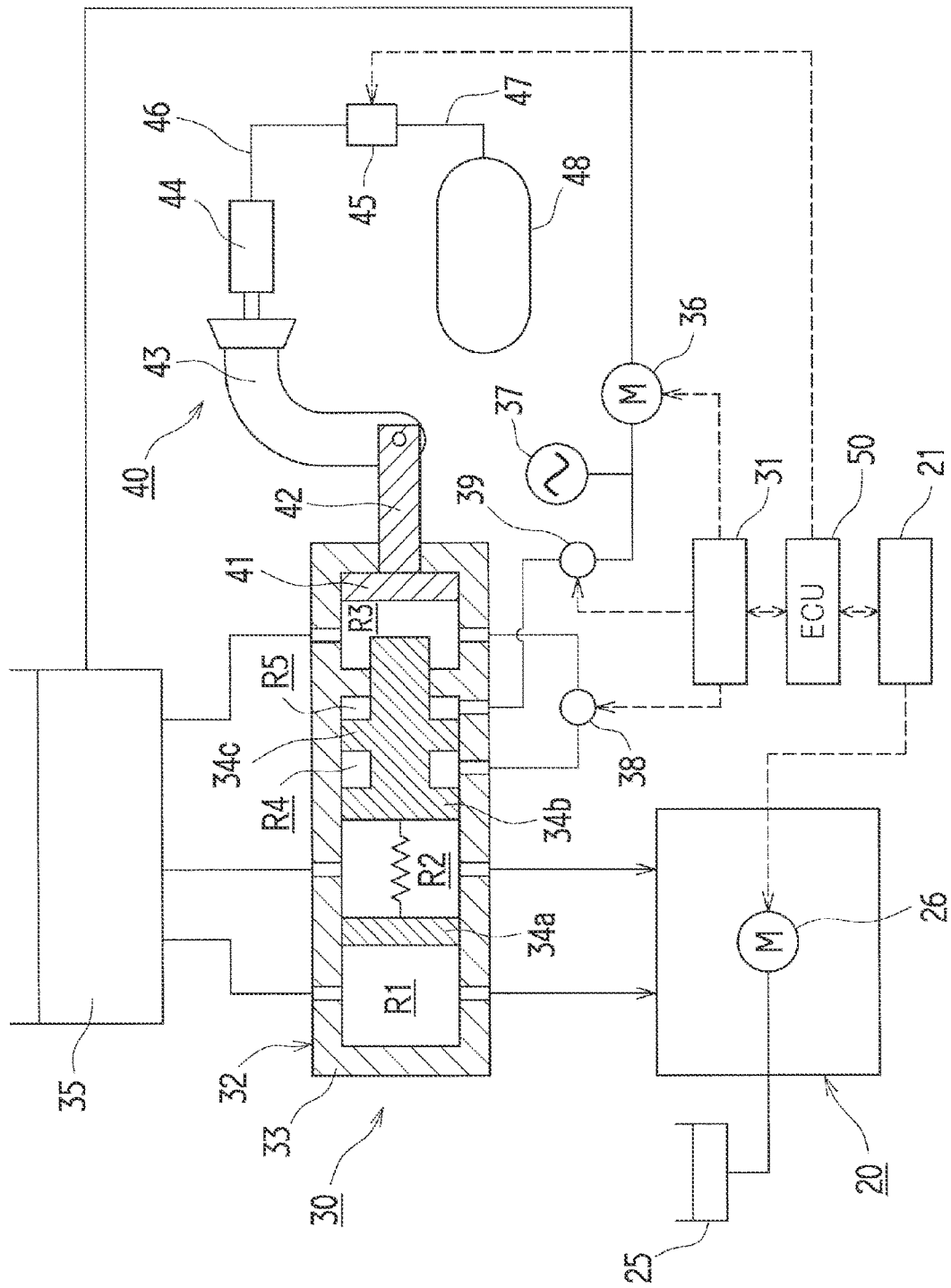
FIG. 5 is a view schematically illustrating brake fluid pressure generation devices in FIG. 4 (a brake actuator, a brake unit, and a brake pedal unit)

As illustrated in FIG. 5, the master cylinder 32 is configured to generate brake fluid pressure in accordance with strokes of first and second pistons 34a, 34b sliding inside a cylinder housing 33.

First to fifth fluid chambers R1, R2, R3, R4, R5 are defined by the cylinder housing 33 of the master cylinder 32, the first and second pistons 34a, 34b, and an input piston 41.

The first fluid chamber R1 is connected to the reservoir tank 35 and the first fluid chamber 23 of the brake actuator 20, and hydraulic fluid inside the first fluid chamber R1 is pressurized by the first piston 34a.

The second fluid chamber R2 is provided between the first piston 34a and the second piston 34b and is connected to the reservoir tank 35 and the second fluid chamber 24 of the brake actuator 20. Hydraulic fluid inside the second fluid chamber R2 is pressurized by the second piston 34b.

A rib portion 34c is provided in the second piston 34b such that the fourth fluid chamber R4 is provided on a first side of the rib portion 34c (a side close to the first and second fluid chambers R1, R2), and the fifth fluid chamber R5 is provided on a second side of the rib portion 34c (a side close to the third fluid chamber R3).

The third fluid chamber R3 is connected to the reservoir tank 35 and the fourth fluid chamber R4, and hydraulic fluid inside the third fluid chamber R3 is pressurized by the input piston 41. Note that the third fluid chamber R3 and the fourth fluid chamber R4 are connected to each other via the first electromagnetic valve 38 that opens in an energized state.

The electric motor 36 is configured to pressurize hydraulic fluid pumped up from the reservoir tank 35 and accumulate the hydraulic fluid thus pressurized in the accumulator 37. The accumulator 37 is connected to the fifth fluid chamber R5 via the second electromagnetic valve 39 that opens in the energized state.

The brake ECU 31 is connected to the ECU 50 via a communication line, and based on a braking force request calculated by the ECU 50, the brake ECU 31 opens the second electromagnetic valve 39 so as to release the high-pressure hydraulic fluid so that the first and second pistons 34a, 34b are slid inside the cylinder housing 33 by the high-pressure hydraulic fluid.

Note that the brake ECU 31 is configured to maintain the first electromagnetic valve 38 in the energized state (a valve open state) except when the brake ECU 31 actuates the brake pedal unit 40 and also maintain the second electromagnetic valve 39 in a non-energized state (a valve close state) except when the brake ECU 31 actuates the brake unit 30.

The brake fluid pressure thus generated in accordance with the strokes of the first and second pistons 34a, 34b is supplied from the first and second ports 32a, 32b of the master cylinder 32 to the first to fourth brake calipers 11a, 12a, 13a, 14a via the first and second fluid chambers 23, 24 of the brake actuator 20, as illustrated in FIG. 4.

As such, the brake unit 30 generates the brake fluid pressure independently from the brake actuator 20. Accordingly, even in a case where an electric system of the brake actuator 20 has a malfunction, when at least either one of the first and second fluid chambers 23, 24 is not damaged, it is possible to supply the brake fluid pressure to the wheels 2, 3.

The brake pedal unit 40 functions as an emergency brake fluid pressure generation device mainly at the time when the brake actuator 20 and the brake unit 30 are inoperative.

For example, the brake pedal unit 40 is configured to generate brake fluid pressure instead of the brake actuator 20 and the brake unit 30 when the electric vehicle 1 has power outage or the like.

As illustrated in FIGS. 4 and 5, the brake pedal unit 40 includes the input piston 41, a rod 42, a brake pedal 43, an air cylinder 44, a solenoid BOX 45, a hose 46, a hose 47, the air tank 48, and so on.

The input piston 41 is inserted into the cylinder housing 33 of the brake unit 30 in a slidable manner. The rod 42 connects the input piston 41 to the brake pedal 43.

The brake pedal 43 is biased by a spring (not shown) to an opposite direction from a direction where the input piston 41 is pushed toward a pressurizing side, and when a valve inside the solenoid BOX 45 closes, the brake pedal 43 returns to its original position.

The air cylinder 44 is connected to the air tank 48 via the solenoid BOX 45 configured such that the valve inside the solenoid BOX 45 closes in the energized state. The air cylinder 44 is configured to rotate the brake pedal 43 when the air cylinder 44 is actuated by the compressed air filled in the air tank 48 as the valve (not shown) inside the solenoid BOX 45 opens at the time when a given condition such as power outage of the electric vehicle 1 is satisfied. Note that the solenoid BOX 45 is energized so as to be maintained in a state where the valve (not shown) inside the solenoid BOX 45 is closed except when the ECU 50 actuates the brake pedal unit 40.

The air cylinder 44 communicates with the solenoid BOX 45 via the hose 46, and the solenoid BOX 45 communicates with the air tank 48 via the hose 47.

Note that the input piston 41, the rod 42, and the brake pedal 43 constitute a pushing member configured to push the first and second pistons 34a, 34b, and the air cylinder 44, the solenoid BOX 45, and the hoses 46, 47 constitute a pneumatic pressure supply unit configured to supply pneumatic pressure as driving force to rotate the brake pedal 43.

In such a brake pedal unit 40, the brake pedal 43 is rotated by the air cylinder 44 so as to push the input piston 41 (see FIG. 5) toward the pressurizing side. Hereby, the first and second pistons 34a, 34b of the master cylinder 32 are caused to stroke and generate brake fluid pressure.

The brake fluid pressure thus generated by the master cylinder 32 is supplied from the first and second ports 32a, 32b to the first to fourth brake calipers 11a, 12a, 13a, 14a via the first and second fluid chambers 23, 24 of the brake actuator 20.

Thus, the brake pedal unit 40 also generates the brake fluid pressure by use of the master cylinder 32. That is, in the present embodiment, both the brake unit 30 and the brake pedal unit 40 use the single master cylinder 32.

As such, the brake pedal unit 40 generates the brake fluid pressure independently from the brake actuator 20 and the brake unit 30. Accordingly, even in a case where the electric systems of the brake actuator 20 and the brake unit 30 have malfunctions, for example, when the given condition is satisfied, the brake pedal unit 40 can supply the brake fluid pressure to the wheels 2, 3.

Operation of Braking Device 10

As described above, in the present embodiment, (A) at normal time when the electric system does not have any malfunction or the like, the brake actuator 20 supplies the brake fluid pressure as the primary brake fluid pressure generation device.

In the meantime, (B) at abnormal time when the electric system and so on have a malfunction, (B-1) in a case where the brake actuator 20 has a malfunction, the brake unit 30 supplies the brake fluid pressure, and (B-2) in a case where the brake actuator 20 and the brake unit 30 have malfunctions due to power outage or the like, the brake pedal unit 40 supplies the brake fluid pressure.

Note that the brake fluid pressure of the emergency stop brake operated by the operator may be generated by any of the brake actuator 20, the brake unit 30, and the brake pedal unit 40.

Although not illustrated herein, the first to fourth brake calipers 11a, 12a, 13a, 14a each have a generally well-known configuration including a wheel cylinder and a brake pad. When the brake fluid pressure is supplied to the wheel cylinders from the first to fourth ports 23a, 23b, 24a, 24b, the brake pads are pressed against the first to fourth brake discs 11b, 12b, 13b, 14b, respectively, so as to generate frictional braking force, so that the electric vehicle 1 is decelerated or stopped.

Next will be briefly described an example of a device configuration in which only the brake actuator 20 is actuated in the case of (A), the brake unit 30 is actuated in the case of (B-1), and the brake pedal unit 40 is actuated in the case of (B-2).

Here, in the case of (A), the brake ECU 31 closes the second electromagnetic valve 39 (the non-energized state), and the brake ECU 21 of the brake actuator 20 actuates the electric motor 26 so that the electric motor 26 pumps up the hydraulic fluid from the reservoir tank 25 and pressurizes the hydraulic fluid. Hereby, the electric vehicle 1 is decelerated or stopped by the brake fluid pressure from the brake actuator 20 only.

In the meantime, in the case of (B-1), the brake ECU 31 brings the second electromagnetic valve 39 into the energized state so that the second electromagnetic valve 39 opens, and the brake ECU 31 supplies hydraulic fluid stored in the accumulator 37 in a pressurized state to the fifth fluid chamber R5. Here, since the first electromagnetic valve 38 is in the energized state (in the valve open state), fluid pressure in the third fluid chamber R3 and fluid pressure in the fourth fluid chamber R4 that faces the third fluid chamber R3 cancel each other, so that the second piston 34b operates only with fluid pressure in the fifth fluid chamber R5. Thus, in the case of (B-1), the electric vehicle 1 is decelerated or stopped by the brake fluid pressure from the brake unit 30 only.

Further, in the case of (B-2), the first electromagnetic valve 38 closes and the valve inside the solenoid BOX 45 opens due to power outage, for example.

As a result, the air cylinder 44 is actuated by the compressed air filled in the air tank 48 so as to rotate the brake pedal 43, thereby resulting in that the input piston 41 is pushed toward the pressurizing side, and the fluid pressure in the third fluid chamber R3 increases.

Here, when the first electromagnetic valve 38 is closed, the fluid pressure in the third fluid chamber R3 does not cancel the fluid pressure in the fourth fluid chamber R4 that faces the third fluid chamber R3, so that the second piston 34b operates only with the fluid pressure in the third fluid chamber R3. Hereby, the electric vehicle 1 is decelerated or stopped by the brake fluid pressure from the brake pedal unit 40 only.

As described above, at normal time, the electric vehicle 1 of the present embodiment can be decelerated or stopped by the power of the battery 52, and when the electric vehicle 1 has power outage or the like, the electric vehicle 1 can be decelerated or stopped by the compressed air in the air tank 48 without a need of stepping force or the like applied by the driver. Accordingly, it is possible to employ the layout in which the brake pedal is not permanently provided in the vehicle cabin 4 as described above.

Arrangement of Brake Fluid Pressure Generation Device

As illustrated in FIG. 3, the brake actuator 20, the brake unit 30, the brake pedal unit 40, and an air conditioner unit 53 as an air-conditioning device are stored in the first storage chamber 5, and the electric drive motor 51 as a driving source of the electric vehicle 1 is stored inside the second storage chamber 7 provided on the opposite side from the first storage chamber 5.

As such, in the electric vehicle 1 in which the vehicle cabin 4 partially overlaps the first storage chamber 5 and the second storage chamber 7 in the vehicle front-rear direction, the electric drive motor 51, the brake fluid pressure generation devices (20, 30, 40), and the air conditioner unit 53 are arranged in the first storage chamber 5 and the second storage chamber 7 in a divided manner. Hereby, while respective spaces of the first storage chamber 5 and the second storage chamber 7 are used effectively, load distribution to the front side and the rear side of the electric vehicle 1 can be set appropriately.

Figure 8:
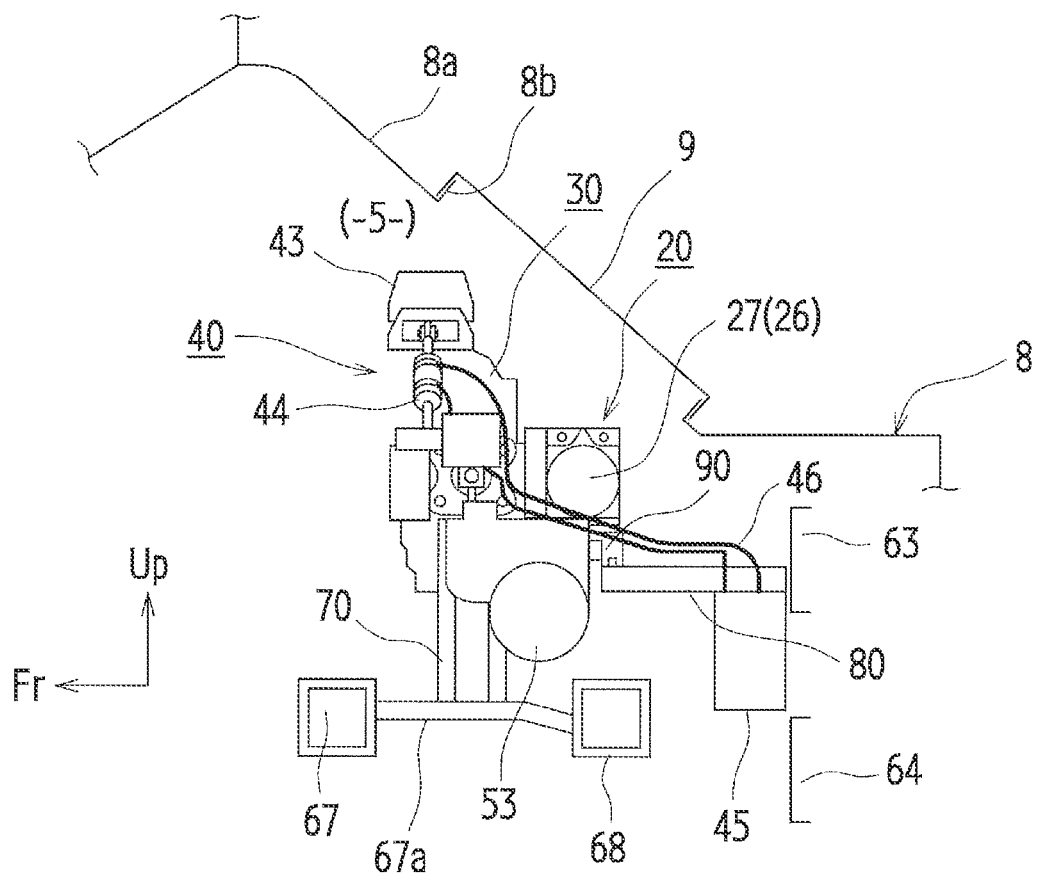
FIG. 8 is a view of the brake fluid pressure generation devices in FIG. 6 when the brake fluid pressure generation devices are viewed from their left side faces.

As illustrated in FIG. 8, the brake actuator 20, the brake unit 30, and the brake pedal unit 40 are stored at a position facing an opening 8b provided in a partition wall 8a that separates the vehicle cabin 4 from the first storage chamber 5. A cover 9 configured to open and close the opening 8b is provided in the opening 8b.

Note that the partition wall 8a is provided in the frame member 8. Although not illustrated herein, for example, the cover 9 can be constituted by a part of trim components (e.g., a shelf, a trim panel, the occupant seat 4a, and so on) of the vehicle cabin 4.

Hereby, when the opening 8b is closed by the cover 9, the brake actuator 20, the brake unit 30, and the brake pedal unit 40 are not exposed to the vehicle cabin 4 side. In the meantime, when the cover 9 is removed to open the opening 8b, the brake actuator 20, the brake unit 30, and the brake pedal unit 40 are exposed to the vehicle cabin 4 side.

Consequently, at the time of performing maintenance on the brake actuator 20, the brake unit 30, and the brake pedal unit 40, the maintenance is performable from the vehicle cabin 4 side through the opening 8b. Thus, the workability of the maintenance is improved in comparison with a case where the brake actuator 20, the brake unit 30, and the brake pedal unit 40 are stored at a position where they are not observable from the opening 8b or a position far from the opening 8b, for example.

Next will be described the arrangement of the brake actuator 20, the brake unit 30, and the brake pedal unit 40 in the first storage chamber 5.

Figure 6:
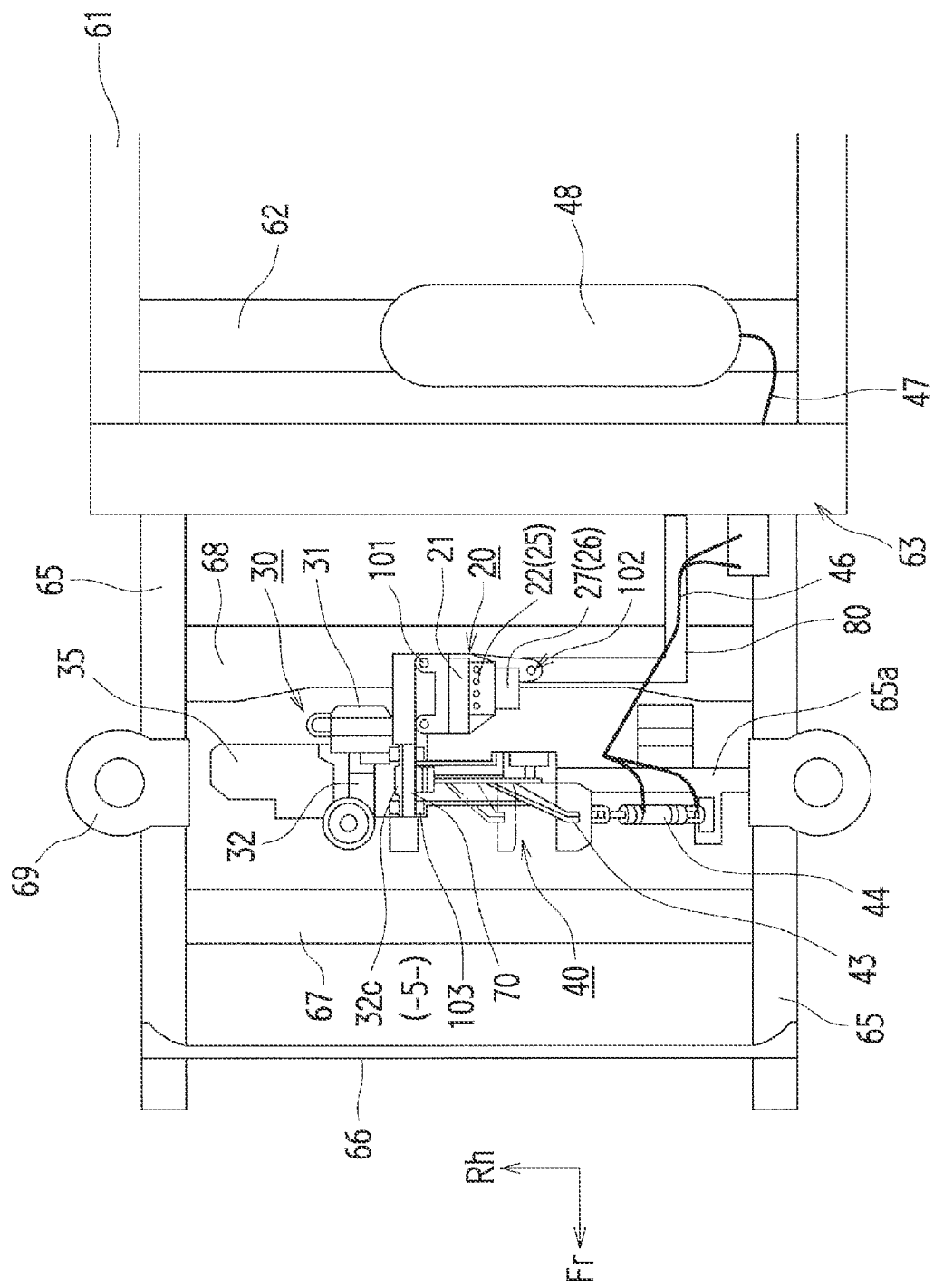
FIG. 6 is a plan view schematically illustrating a state where the brake fluid pressure generation devices in FIG. 5 are mounted on the vehicle.

First briefly described is the first storage chamber 5. As illustrated in FIG. 6, a pair of right and left side rails 61 is provided in a location corresponding to the third storage chamber 6 in FIG. 2 such that the right and left side rails 61 are placed on both end sides of the third storage chamber 6 in the vehicle width direction and extend in the vehicle front-rear direction.

The side rails 61 are connected to each other via a crossmember 62 extending in the vehicle width direction. Front end portions of the side rails 61 are connected to a lower crossmember 64 out of two crossmembers 63, 64 arrayed in the up-down direction as illustrated in FIG. 8. The first storage chamber 5 is provided in front of the crossmembers 63, 64 in the vehicle front-rear direction.

More specifically, as illustrated in FIG. 6, a pair of right and left front side members 65 is provided such that the right and left front side members 65 extend forward in the vehicle front-rear direction from both end portions, in the vehicle width direction, of the upper crossmember 63, and front end portions of the right and left front side members 65 are connected to each other via a crossmember 66.

Further, a pair of front and rear crossmembers 67, 68 (see FIG. 8) is provided so as to stretch over between the right and left front side members 65 such that the front and rear crossmembers 67, 68 extend in the vehicle width direction at a position below the front side members 65 and the crossmembers 63, 66.

Figure 7:
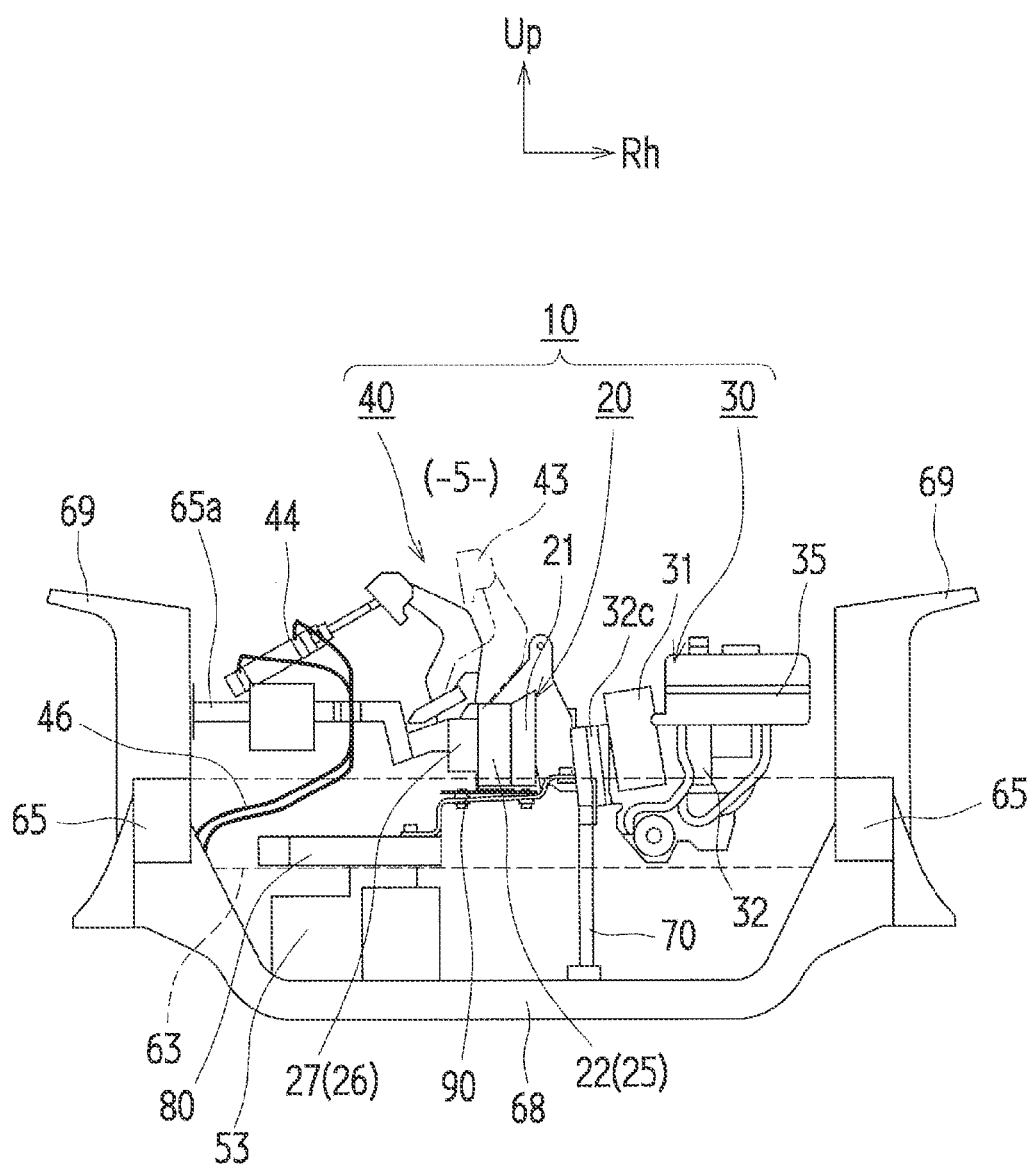
FIG. 7 is a view of the brake fluid pressure generation devices in FIG. 6 when the brake fluid pressure generation devices are viewed from a predetermined position behind them.

As illustrated in FIG. 7, each of the crossmembers 67, 68 extends in the vehicle width direction such that both end portions thereof extend to be inclined upwardly toward outer sides in the vehicle width direction and are attached to respective lower parts of the front side member 65. Note that a reference numeral 69 in FIGS. 6 and 7 indicates a suspension tower.

With such a configuration, the right and left sides of the first storage chamber 5 are defined by the right and left front side members 65, the front and rear sides of the first storage chamber 5 are defined by the crossmembers 63, 66, and the lower side of the first storage chamber 5 is defined by the crossmembers 67, 68.

As illustrated in FIGS. 4, 6, and 7, in the brake unit 30, the reservoir tank 35 extending in the same direction as the cylinder housing 33 is provided above the cylinder housing 33 extending in a longitudinal direction of the master cylinder 32, that is, in a sliding direction of the first and second pistons 34a, 34b.

Therefore, as the brake unit 30 as a whole, a length of the brake unit 30 in an extending direction (a longitudinal direction) of the cylinder housing 33 is longer than a length of the brake unit 30 in a direction (a direction perpendicular to the longitudinal direction) orthogonal to the extending direction of the cylinder housing 33 and a length of the brake unit 30 in the up-down direction. Note that the brake ECU 31 is provided on a side face of the cylinder housing 33.

As such, as illustrated in FIGS. 6 and 7, the brake unit 30 with the longitudinal direction being along the extending direction of the cylinder housing 33 (the sliding direction of the first and second pistons 34a, 34b) is arranged in the first storage chamber 5 such that the longitudinal direction of the brake unit 30 is parallel to the vehicle width direction.

More specifically, as illustrated in FIG. 8, a support bracket 67a extending in the vehicle front-rear direction is provided so as to stretch over between the two crossmembers 67, 68 arrayed in the front-rear direction.

As illustrated in FIG. 6, as a flange portion 32c of the cylinder housing 33 is fastened by bolts 103 to an upper end portion of a first bracket 70 extending upward from the support bracket 67a, the brake unit 30 is arranged such that its longitudinal direction is along the vehicle width direction.

Further, as illustrated in FIG. 6, the brake pedal unit 40 that shares the master cylinder 32 with the brake unit 30 is arranged in the first storage chamber 5 so as to be arrayed with the brake unit 30 in the vehicle width direction.

More specifically, the rod 42 extends in the vehicle width direction, the rod 42 being connected to the input piston 41 inserted in the cylinder housing 33 extending in the vehicle width direction. Therefore, the brake pedal 43 rotatably attached to a distal end portion of the rod 42 is also arrayed with the brake unit 30 in the vehicle width direction.

Further, the air cylinder 44 configured to rotate the brake pedal 43 is fixed to a bracket 65a extending in the vehicle width direction from the front side member 65 such that the air cylinder 44 is arrayed with the brake unit 30 and the brake pedal 43 in the vehicle width direction.

Note that the air tank 48 configured to supply the compressed air to the air cylinder 44 is arranged above the crossmember 62 provided below the vehicle cabin 4 and behind the first storage chamber 5.

Hereby, in the present embodiment, as illustrated in FIG. 6, the brake unit 30 and the brake pedal unit 40 extending in the vehicle width direction are arrayed generally linearly in the vehicle width direction.

In the brake actuator 20, as illustrated in FIGS. 6 and 7, the brake ECU 21, the actuator body portion 22 (including the reservoir tank 25), and a motor housing 27 in which the electric motor 26 is housed are provided so as to be arrayed in this order. Therefore, as the brake actuator 20 as a whole, a length of the brake actuator 20 in an array direction (also referred to as an arrangement direction) where those members are arrayed is longer than a length of the brake actuator 20 in a direction orthogonal to the arrangement direction and a length of the brake actuator 20 in the up-down direction.

As such, as illustrated in FIGS. 6 and 7, the brake actuator 20 provided so as to be long in the arrangement direction is arranged behind the brake pedal 43 in the vehicle front-rear direction (near the brake unit 30 and behind the brake unit 30 in the vehicle front-rear direction) in the first storage chamber 5 such that the longitudinal direction (the arrangement direction) of the brake actuator 20 is parallel to the vehicle width direction.

More specifically, as illustrated in FIGS. 6 and 8, an L-shaped second bracket 80 is attached to the upper crossmember 63. The second bracket 80 is configured such that, after the second bracket 80 extends forward in the vehicle front-rear direction from a front end of the crossmember 63, the second bracket 80 is bent at a right angle and extends to the right side in the vehicle width direction.

A distal end portion of the second bracket 80 and the upper end portion of the first bracket 70 are connected to an actuator bracket 90 via respective bolts 101, 102, and hereby, the first and second brackets 70, 80 are integrated with the actuator bracket 90.

The brake actuator 20 is fastened to the actuator bracket 90 by bolts as illustrated in FIG. 7, and thus, the brake actuator 20 is arranged behind the brake pedal 43 in the vehicle front-rear direction such that the brake actuator 20 is parallel to the vehicle width direction as illustrated in FIG. 6.

Here, as illustrated in FIGS. 7 and 8, the brake actuator 20, the brake unit 30, and the brake pedal unit 40 are arranged at generally the same height in the first storage chamber 5. Further, generally, it is assumed that the brake pedal 43 is rotated by stepping force applied by a driver, and therefore, the brake pedal 43 is rotated below the rod 42. However, in the present embodiment, the brake pedal 43 is rotated by the air cylinder 44, so that the brake pedal 43 is rotated above the rod 42 as illustrated in FIGS. 7 and 8.

Hereby, as illustrated in FIG. 8, a relatively large space is formed below the brake actuator 20 and the brake pedal unit 40 in the first storage chamber 5. On this account, in the present embodiment, the air conditioner unit (the air-conditioning device) 53 is arranged in the space as illustrated in FIGS. 7 and 8.

As described above, in the embodiment to which the present disclosure is applied, the vehicle cabin 4 partially overlaps the first storage chamber 5 and the second storage chamber 7 in the vehicle front-rear direction, and then, the electric drive motor 51, the brake fluid pressure generation devices (20, 30, 40), and the air conditioner unit 53 are stored in the first storage chamber 5 and the second storage chamber 7 in a divided manner. Accordingly, while respective spaces of the first storage chamber 5 and the second storage chamber 7 are used effectively, load distribution to the front side and the rear side of the vehicle can be set appropriately.

Besides, in the above embodiment, the battery 52 is arranged in the third storage chamber 6 under the floor of the vehicle cabin 4, that is, in the middle of the electric vehicle 1 in the vehicle front-rear direction. This is advantageous to appropriately set load distribution to the front side and the rear side of the electric vehicle 1.

Further, the brake fluid pressure generation devices (20, 30, 40) as constituents that require regular maintenance are stored in the first storage chamber 5 separated from the vehicle cabin 4 such that the brake fluid pressure generation devices face the opening 8*b*.

Consequently, at the time of performing maintenance on the brake actuator 20 and the brake unit 30, the maintenance is performable while the brake actuator 20 and the brake unit 30 are observed from the vehicle cabin 4 side through the opening 8*b*. Thus, the workability of the maintenance is improved in comparison with a case where the brake actuator 20 and the brake unit 30 are stored at a position where the brake actuator 20 and the brake unit 30 are not observable from the opening 8*b* or at a position far from the opening 8*b*, for example. In addition, the degree of freedom of the layout in the vehicle cabin 4 is improved.

Further, in the present embodiment, the brake fluid pressure generation devices (20, 30, 40) and the air-conditioning device (the air conditioner unit 53) are arranged so as to overlap each other in the vehicle front-rear direction. Accordingly, in comparison with a case where the brake fluid pressure generation devices (20, 30, 40) and the air-conditioning device (the air conditioner unit 53) are arranged so as not to overlap each other, the first storage chamber 5 in which the brake fluid pressure generation devices (20, 30, 40) and the air-conditioning device (the air conditioner unit 53) are stored can be reduced in size in the vehicle front-rear direction. This is accordingly advantageous to increase the space for the vehicle cabin 4 as large as possible.

Further, in the present embodiment, the brake unit 30 is arranged such that the longitudinal direction of the master cylinder 32, that is, the sliding direction of the first and second pistons 34*a*, 34*b* is parallel to the vehicle width direction.

This allows an axle (not shown), the crossmembers 63, 67, 68, and so on provided along the vehicle width direction to be arranged in parallel to the brake unit 30 inside the first storage chamber 5.

On this account, in comparison with a case where the brake unit 30 is arranged, for example, in parallel to the vehicle front-rear direction like a manual driving vehicle including a conventional and general driver seat, in other words, a case where many devices and members extending in the vehicle width direction are provided together with the brake unit 30 arranged in parallel to the vehicle front-rear direction, the first storage chamber 5 can be reduced in size in the vehicle front-rear direction. This is accordingly advantageous to increase the space for the vehicle cabin 4 as large as possible.

Further, as illustrated in FIG. 2, the first storage chamber 5 is provided to extend rearward in the vehicle front-rear direction from a part above axles (not shown) of the front wheels 2. In addition, as illustrated in FIG. 3, heavy goods including the brake actuator 20, the brake unit 30, the brake pedal unit 40, and the air conditioner unit 53 are stored in the first storage chamber 5. Hereby, the heavy goods are arranged above the axels (not shown) of the front wheels 2 or in a region including a part above the axles of the front wheels 2 and a part further behind the axles in the vehicle front-rear direction. This makes it possible to increase behavioral stability of the electric vehicle 1.

Further, when the brake actuator 20 and the brake unit 30 are inoperable, the brake fluid pressure can be generated by the brake pedal unit 40 as an emergency brake fluid pressure generation device by causing the first and second pistons 34*a*, 34*b* of the master cylinder 32 to stroke. Therefore, it is possible to achieve fail safe. In addition, since the brake pedal unit 40 is arranged to be arrayed with the brake unit 30 in the vehicle width direction, it is possible to reduce the size of the first storage chamber 5.

Besides, the brake pedal unit 40 as the emergency brake fluid pressure generation device is stored in the first storage chamber 5 such that the brake pedal unit 40 faces the opening 8*b*. This makes it possible to improve the workability of maintenance on the brake pedal unit 40.

Besides, the brake pedal unit 40 is pneumatically actuated. Accordingly, even when the electric vehicle 1 has power outage, the electric vehicle 1 can be surely decelerated or stopped without requesting operations by a driver. Thus, it is not necessary to provide a brake pedal and its equivalent in the vehicle cabin 4, thereby making it possible to further increase the space for the vehicle cabin 4.

Further, the brake actuator 20 is arranged behind (inwardly from) the brake unit 30 in the vehicle front-rear direction. Accordingly, even when the brake unit 30 thus arranged in front of (outwardly from) the brake actuator 20 in the vehicle front-rear direction is damaged at the time of a vehicle collision, it is possible to lower the possibility of breakage of the brake actuator 20.

Even when the brake unit 30 is damaged, it is possible to avoid malfunctions of the whole braking device 10 because the brake actuator 20 is provided on the downstream side from the brake unit 30 in the fluid pressure transmission route and generates the brake fluid pressure independently from the brake unit 30.

Further, since the brake actuator 20 is arranged near the brake unit 30 in the first storage chamber 5, it is possible to shorten the first to fourth brake pipes 11, 12, 13, 14 and to maintain the first storage chamber 5 to be compact.

Further, the brake actuator 20, the brake unit 30, and the brake pedal unit 40 are arranged at generally the same height in the first storage chamber 5, and the air conditioner unit (air-conditioning device) 53 is arranged in the space formed below the braking device 10. In other words, the brake fluid pressure generation devices (20, 30, 40) are arranged so as to be vertically arrayed with the air conditioner unit 53 in the vehicle up-down direction. Accordingly, it is possible to further reduce the size of the first storage chamber 5.

Due to the synergistic effect obtained by the compactification of the first storage chamber 5 and the forming of the first storage chamber 5 and the second storage chamber 7 such that the first storage chamber 5 and the second storage chamber 7 partially overlap the vehicle cabin 4 in the vehicle front-rear direction, it is possible to more surely increase the space for the vehicle cabin 4.

In addition, the brake pedal unit 40 employs a configuration in which the brake fluid pressure is generated such that the brake pedal 43 causes the first and second pistons 34*a*, 34*b* of the master cylinder 32 to stroke, except that pneumatic pressure is used instead of stepping force applied by a driver. On this account, a master cylinder, a brake pedal, and so on to be used in a conventional and general manual driving vehicle can be used just as they are, for example. This is advantageous to restrain an increase in cost.

The present disclosure is not limited to the above embodiment and can be modified appropriately within the scope of claims and within a scope equivalent thereto.

(1) The above embodiment deals with an example in which the brake fluid pressure generation devices (the brake actuator 20, the brake unit 30, and the brake pedal unit 40) are provided in the braking device 10. However, the present disclosure is not limited to this.

For example, one brake fluid pressure generation device may be used, provided that the brake fluid pressure generation device generates brake fluid pressure in accordance with strokes of pistons sliding in a cylinder housing, and the brake fluid pressure generation device is arranged in a storage chamber such that a sliding direction of the pistons is parallel to the vehicle width direction.

(2) The above embodiment deals with an example in which the brake pedal unit 40 as the emergency brake fluid pressure generation device is pneumatically actuated. However, the present disclosure is not limited to this.

For example, the brake pedal unit 40 may be hydraulically actuated or electrically actuated, provided that the brake fluid pressure can be generated by causing the first and second pistons 34*a*, 34*b* to stroke when the brake unit 30 is inoperable, for example.

(3) The above embodiment deals with an example in which the brake unit 30 and the brake pedal unit 40 are arrayed in the vehicle width direction, and the brake actuator 20 is arranged behind the brake unit 30 and the brake pedal unit 40 in the vehicle front-rear direction. However, the present disclosure is not limited to this. For example, the brake actuator 20, the brake unit 30, and the brake pedal unit 40 may be arrayed in the vehicle width direction.

(4) The above embodiment deals with (B-2) as a case where the brake pedal unit 40 is actuated. However, the present disclosure is not limited to this. For example, when the electric vehicle 1 is parked, the brake pedal unit 40 may be actuated as a parking brake.

(5) The above embodiment deals with an example in which the brake actuator 20, the brake unit 30, and the brake pedal unit 40 are stored in the first storage chamber 5. However, the present disclosure is not limited to this.

For example, although not illustrated herein, any two brake fluid pressure generation devices (20, 30), (20, 40), or (30, 40) out of the brake actuator 20, the brake unit 30, and the brake pedal unit 40 can be stored in the first storage chamber 5.

(6) The above embodiment deals with an example in which both the brake unit 30 and the brake pedal unit 40 use the master cylinder 32 in common. However, the present disclosure is not limited to this.

For example, although not illustrated herein, the brake unit 30 and the brake pedal unit 40 may be configured to include respective master cylinders 32.

(7) The above embodiment deals with an example in which the brake actuator 20, the brake unit 30, the brake pedal unit 40, and the air conditioner unit 53 (the air-conditioning device) are stored in the first storage chamber 5, and the electric drive motor 51 is stored in the second storage chamber 7. However, the present disclosure is not limited to this.

For example, although not illustrated herein, in a reverse manner to the above, the electric drive motor 51 can be stored in the first storage chamber 5, and the brake actuator 20, the brake unit 30, the brake pedal unit 40, and the air conditioner unit 53 (the air-conditioning device) can be stored in the second storage chamber 7.

(8) The above embodiment deals with an example in which the electric vehicle 1 employs a drive system in which the electric drive motor 51 inputs driving force into the rear wheels 3. However, the present disclosure is not limited to this.

For example, although not illustrated herein, in a case where such a configuration is employed that the electric drive motor 51 is stored in the first storage chamber 5, and the brake actuator 20, the brake unit 30, the brake pedal unit 40, and the air conditioner unit 53 (the air-conditioning device) are stored in the second storage chamber 7, the vehicle 1 may employ a drive system in which the electric drive motor 51 inputs driving force into the front wheels 2.

(9) In the above embodiment, it is not necessary to completely separate the first storage chamber 5 from the third storage chamber 6 and to completely separate the second storage chamber 7 from the third storage chamber 6. The first storage chamber 5 may communicate with the third storage chamber 6, and the second storage chamber 7 may communicate with the third storage chamber 6.

(10) In the above embodiment, an auxiliary seat for an operator can be provided in the vehicle cabin 4.

Thus, the above embodiment is just an example in every respect and must not be interpreted restrictively. Further, modifications and alterations belonging to an equivalent range of claims are all included in the present disclosure.

The present disclosure can be used appropriately for an electric vehicle that can transport a passenger by automated driving.

What is claimed is:

1. An electric vehicle comprising:
    a motor configured to generate driving force for traveling;
    a braking device for wheel braking, the braking device including a brake fluid pressure generation device;
    an air-conditioning device; and
    a battery as a power source for the motor, wherein:
    the vehicle is not provided with a driver seat that allows a user to operate a steering wheel, an accelerator pedal, and a brake pedal in a state where the user sits on the driver seat;
    the vehicle is configured to perform automated driving;
    a first storage chamber and a second storage chamber are provided in a first end portion and a second end portion of the vehicle in a vehicle front-rear direction, respectively, such that the first storage chamber and the second storage chamber partially overlap a vehicle cabin in the vehicle front-rear direction;
    a third storage chamber is provided under a floor of the vehicle cabin;
    an occupant seat is provided in either one of first and second end portions inside the vehicle cabin in the vehicle front-rear direction such that the occupant seat faces the other one of the first and second end portions;
    the motor is stored in either one of the first storage chamber and the second storage chamber;
    the brake fluid pressure generation device and the air-conditioning device are stored in the other one of the first storage chamber and the second storage chamber; and
    the battery is stored in the third storage chamber.

2. The electric vehicle according to claim 1, wherein either one of the first and second end portions inside the vehicle cabin in the vehicle front-rear direction is not provided with a steering wheel and a foot brake mechanically connected to wheels.

3. The electric vehicle according to claim 1, wherein the occupant seat is a first occupant seat, and a second occupant seat is provided in the other one of the first and second end portions inside the vehicle cabin in the vehicle front-rear direction such that the second occupant seat faces the one of the first and second end portions.

4. The electric vehicle according to claim 1, wherein the first storage chamber and the second storage chamber extend upward from the third storage chamber.

5. The electric vehicle according to claim 1, wherein the brake fluid pressure generation device and the air-conditioning device are arranged so as to overlap each other in the vehicle front-rear direction.

6. The electric vehicle according to claim 1, wherein:
    the brake fluid pressure generation device includes a reservoir tank in which hydraulic fluid is stored, an actuator body portion configured to supply brake fluid pressure to a wheel brake unit, and an electric motor configured to pressurize the hydraulic fluid in the reservoir tank and supply the hydraulic fluid to the actuator body portion as the brake fluid pressure;
    elements constituting the brake fluid pressure generation device are arrayed in a vehicle width direction; and
    the brake fluid pressure generation device is arranged above the air-conditioning device.

\* \* \* \* \*